(12) United States Patent
Shet et al.

(10) Patent No.: US 9,269,243 B2
(45) Date of Patent: Feb. 23, 2016

(54) METHOD AND USER INTERFACE FOR FORENSIC VIDEO SEARCH

(71) Applicants: Siemens Corporation, Iselin, NJ (US); Siemens Aktiengesellschaft, Munich (DE)

(72) Inventors: Vinay Damodar Shet, Princeton, NJ (US); Xianjun Sam Zheng, Plainsboro, NJ (US); Andreas Hutter, Munich (DE); Xiang Gao, Skillman, NJ (US); Cheng-Hao Kuo, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 422 days.

(21) Appl. No.: 13/646,867

(22) Filed: Oct. 8, 2012

(65) Prior Publication Data
US 2013/0091432 A1 Apr. 11, 2013

Related U.S. Application Data

(60) Provisional application No. 61/544,324, filed on Oct. 7, 2011.

(51) Int. Cl.
*G06F 3/00* (2006.01)
*G08B 13/196* (2006.01)
*G06K 9/32* (2006.01)
*G06F 3/0481* (2013.01)
*G06F 17/30* (2006.01)
*G06K 9/00* (2006.01)

(52) U.S. Cl.
CPC .... *G08B 13/19645* (2013.01); *G06F 17/30112* (2013.01); *G06F 17/30277* (2013.01); *G06F 17/30793* (2013.01); *G06F 17/30823* (2013.01); *G06K 9/3241* (2013.01); *G06F 3/04817* (2013.01); *G06F 17/3079* (2013.01); *G06F 17/30781* (2013.01); *G06F 17/30784* (2013.01); *G06F 17/30825* (2013.01); *G06F 17/30846* (2013.01); *G06K 9/00369* (2013.01); *G06K 9/00771* (2013.01)

(58) Field of Classification Search
CPC ............... G06F 17/30781; G06F 17/30784; G06F 17/3079; G06F 17/30793; G06F 17/30823; G06F 17/30825; G06F 17/30846; G06F 17/30112; G06F 17/30277; G06F 3/04817; G06K 9/3241; G06K 9/00369; G06K 9/00771; G08B 13/19645
See application file for complete search history.

(56) References Cited

U.S. PATENT DOCUMENTS

| | | | | |
|---|---|---|---|---|
| 6,002,995 A * | 12/1999 | Suzuki | ................... | H04N 5/232 348/143 |
| 6,529,137 B1 * | 3/2003 | Roe | ........................ | G08B 25/14 340/525 |
| 6,665,004 B1 * | 12/2003 | Paff | ................ | G08B 13/19645 348/156 |
| 6,973,200 B1 * | 12/2005 | Tanaka | ............... | H04N 5/23203 348/169 |
| 7,152,209 B2 * | 12/2006 | Jojic | ................. | G06F 17/30825 382/305 |
| 7,607,169 B1 * | 10/2009 | Njemanze | .......... | H04L 63/1416 726/22 |
| 7,634,662 B2 * | 12/2009 | Monroe | ............. | G06K 9/00221 382/117 |
| 7,777,783 B1 * | 8/2010 | Chin | ............... | G08B 13/19641 348/153 |
| 7,791,466 B2 * | 9/2010 | Agarwalla | ....... | G08B 13/19615 340/286.14 |
| 7,995,096 B1 * | 8/2011 | Cressy | ............ | G08B 13/19691 348/143 |
| 8,601,494 B2 * | 12/2013 | Brown | .................. | G06Q 10/10 715/700 |

(Continued)

*Primary Examiner* — Ajay Bhatia
*Assistant Examiner* — Jennifer Nichols

(57) ABSTRACT

A forensic video search user interface is disclosed that accesses databases of stored video event metadata from multiple camera streams and facilitates the workflow of search of complex global events that are composed of a number of simpler, low complexity events.

15 Claims, 23 Drawing Sheets

(56) References Cited

U.S. PATENT DOCUMENTS

| | | | |
|---|---|---|---|
| 2005/0169367 A1* | 8/2005 | Venetianer | G06F 17/30799 375/240.01 |
| 2006/0221184 A1* | 10/2006 | Vallone | G08B 13/19693 348/155 |
| 2006/0288288 A1* | 12/2006 | Girgensohn | G06F 17/3079 715/716 |
| 2007/0164845 A1* | 7/2007 | Ivins | G08B 13/19676 340/3.9 |
| 2007/0257986 A1* | 11/2007 | Ivanov | G08B 13/19671 348/154 |
| 2008/0186379 A1* | 8/2008 | Ishigame | G08B 13/19641 348/116 |
| 2008/0204569 A1* | 8/2008 | Miller | G07F 17/3079 348/222.1 |
| 2008/0263592 A1* | 10/2008 | Kimber | G06F 3/0486 725/38 |
| 2008/0301128 A1* | 12/2008 | Gandert | G06F 17/30265 |
| 2009/0134968 A1* | 5/2009 | Girgensohn | G06K 9/00771 340/3.1 |
| 2009/0240431 A1* | 9/2009 | Chau | G01C 21/3647 701/532 |
| 2009/0262206 A1* | 10/2009 | Park | G08B 13/19641 348/218.1 |
| 2009/0295918 A1* | 12/2009 | Horovitz | H04N 7/181 348/143 |
| 2010/0002082 A1* | 1/2010 | Buehler | G08B 13/19693 348/159 |
| 2010/0013931 A1* | 1/2010 | Golan | G06K 9/00771 348/150 |
| 2010/0070527 A1* | 3/2010 | Chen | G06F 17/30997 707/772 |
| 2010/0277588 A1* | 11/2010 | Ellsworth | G06F 17/3087 348/144 |
| 2012/0194336 A1* | 8/2012 | Thiruvengada | G08B 13/19645 340/525 |
| 2013/0039634 A1* | 2/2013 | Sundar | G08B 13/19645 386/230 |
| 2013/0063592 A1* | 3/2013 | Kingsley | H04N 7/181 348/143 |
| 2013/0155229 A1* | 6/2013 | Thornton | H04N 7/18 348/143 |

* cited by examiner

METHOD AND USER INTERFACE FOR FORENSIC VIDEO SEARCH

CROSS REFERENCE TO RELATED APPLICATIONS

This application claims the benefit of U.S. Provisional Application No. 61/544,324, filed on Oct. 7, 2011, the disclosure which is incorporated herein by reference in its entirety.

BACKGROUND OF THE INVENTION

The invention relates generally to user interfaces. More specifically, the invention relates to a user interface for a forensic video search. Further, the invention relates to the query processing in response to the user interface for a forensic video search.

An increasing need for enhanced site security and safety has fueled a rapid expansion of video camera network installations worldwide. In the United Kingdom alone, as of 2006, it is estimated that there were more than 4.2 million CCTV cameras with over 500,000 installed just in London. Camera networks such as these, often operating 24 hours a day and seven days a week, generate massive amounts of image and video surveillance data.

A vast majority of the data is typically archived for later analysis in case of disruptive events. Often, time-critical information needs to be extracted from the archived surveillance video to aid an ongoing investigation, or to prevent further security breaches or safety infractions. However, due to the sheer volume of data that is acquired and stored, effectively searching through it for interesting events, in a timely manner, becomes an extremely challenging task. Therefore, the amount of data acquired by visual surveillance devices far exceeds the operator's capacity to understand its contents and meaningfully search through it. This represents a fundamental bottleneck in the security and safety infrastructure, and has prevented video surveillance technology from reaching its true potential.

Automated video analytic modules provide one means of addressing this problem by analyzing the contents of a video feed and generating a description of interesting events transpiring in the scene. Video Content Analysis (VCA) modules can be set up for real-time analysis of the video stream to generate alarms as specific events occur. Alternatively, they can also be used to generate, what is referred to as, event metadata that is stored offline in a database. The event metadata database can be searched through and can be used to index the original recorded video.

VCA modules operating in real-time typically analyze only a single camera video stream and capture events in a camera's field of view or scene. It is often the case that detection of complex interesting events requires an examination of events that transpired across multiple cameras that occur over large spans of time, involving multiple actors and objects. Such in-depth analysis has typically required human operator involvement to piece together a big picture from smaller pieces of evidence.

What is desired is a user interface that facilitates the forensic search of complex global events that are composed of a number of simpler, low complexity events.

SUMMARY OF THE INVENTION

The inventors have discovered that it would be desirable to provide a forensic video search user interface that accesses databases of stored video event metadata from multiple camera streams and accesses the corresponding, archived video streams and facilitates the search of complex global events that are composed of a number of simpler, low complexity events.

One aspect of the invention provides a forensic video search User Interface (UI) with query processing for a facility having video camera surveillance. Methods according to this aspect of the invention include generating a display partitioned into "when", "where" and "who" panels, in the "when" panel, entering a point in time and/or a timeline, in the "where" panel, selecting an area or a floor of the facility bringing into view a map or a floor plan wherein the map or the floor plan includes one or more camera icons showing a Field Of View (FOV) representing actual video camera surveillance locations on the selected facility area or floor, based on the entered time and/or timeline and the selected facility area or floor, generating a time-based query to discover events and objects involving human and non-human objects that occurred comprising populating the "who" panel with one or more object thumbnails wherein an object thumbnail is an image that represents an object from a previously recorded video segment where the image is associated with an event.

Another aspect of the invention further comprises a "what" panel and populating the "what" panel with textual descriptions of discovered events that occurred during the entered time and/or timeline and in the selected facility area or floor, wherein an event includes one or more objects, location, time of occurrence and/or type of event.

Another aspect of the invention provides object tracking comprising in the "who" panel, selecting a first object thumbnail, opening an object tracking clipboard, moving the first selected object thumbnail to the object tracking clipboard wherein object thumbnails posted in the object tracking clipboard are query object thumbnails, and marking the camera icon responsible for the first selected object thumbnail, selecting another object thumbnail, moving the another selected object thumbnail to the object tracking clipboard by magnifying the another object thumbnail, bringing into view a list of events and selecting an "add" button, or, manually moving the another selected object thumbnail to the object tracking clipboard, marking the camera icon responsible for the another selected object thumbnail, and linking the another marked camera icon with the first marked camera icon.

Another aspect of the invention provides a re-identification search comprising selecting an assisted re-identification mode comprising generating a query to search for all objects matching one or more query object thumbnails, obtaining a similarity score for each of the object thumbnails in the "who" panel and the query object thumbnails, filtering the similarity scores of each of the object thumbnails in the "who" panel against the query object thumbnails similarity score, and identifying an object thumbnail of interest from the similarity filtered "who" panel object thumbnails.

Another aspect of the invention provides an avatar search comprising in the "who" panel, selecting an avatar icon button, bringing into view a blank avatar, a color palette for defining the avatar's upper body and a color palette for defining the avatar's lower body, coloring the avatar's upper and lower body, and generating a query to search for all human and/or non-human objects having similar visual attributes with the avatar that occurred during the timeline.

Another aspect of the invention provides obtaining a similarity score for each of the object thumbnails in the "who" panel and for the avatar object, filtering the similarity scores of each of the object thumbnails in the "who" panel against the avatar object similarity score, and identifying an object thumbnail of interest from the similarity filtered "who" panel object thumbnails.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
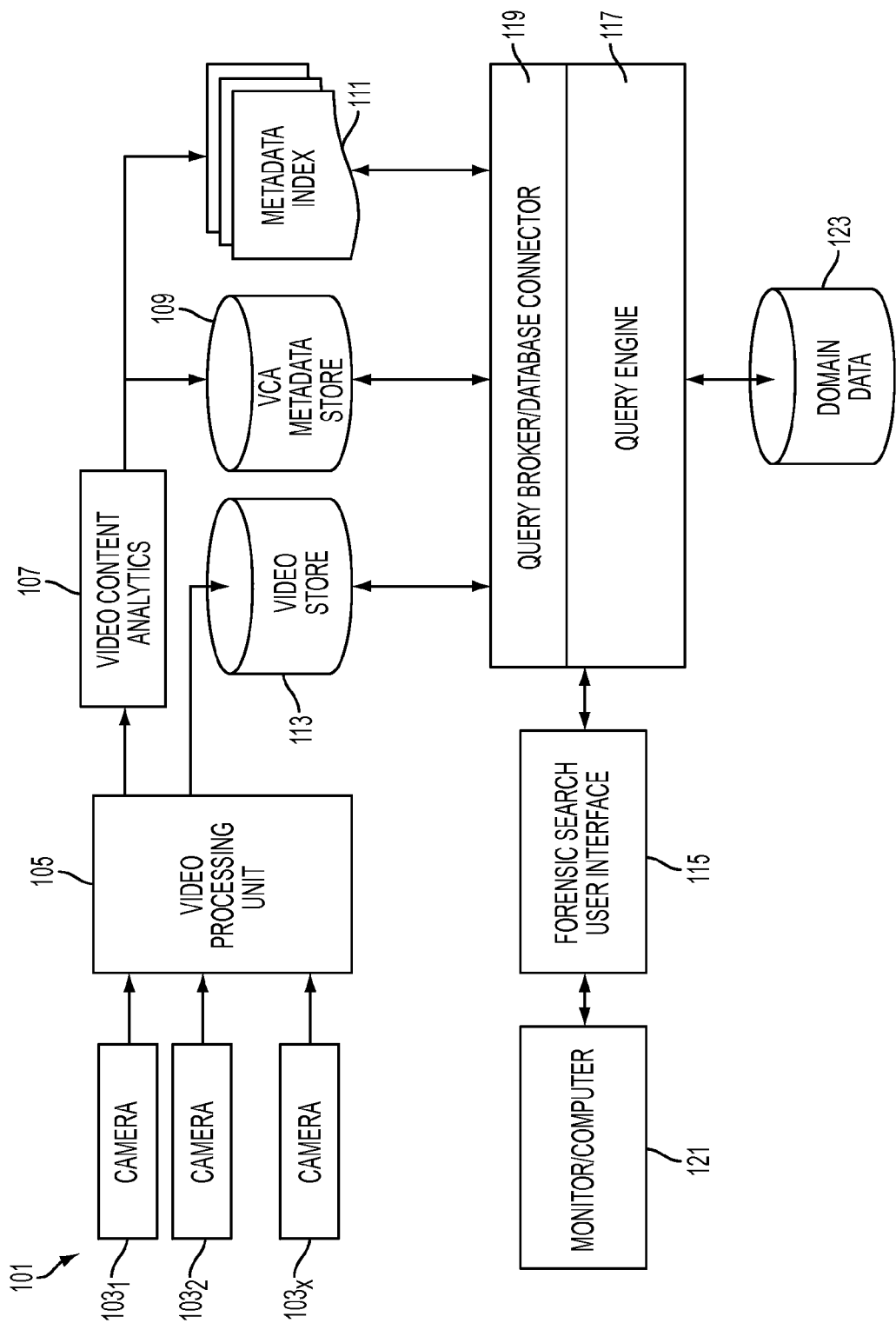
FIG. 1 is an exemplary forensic video search system.
Figure 2:
FIG. 2 is an exemplary forensic video search user interface method.
Figure 2A:
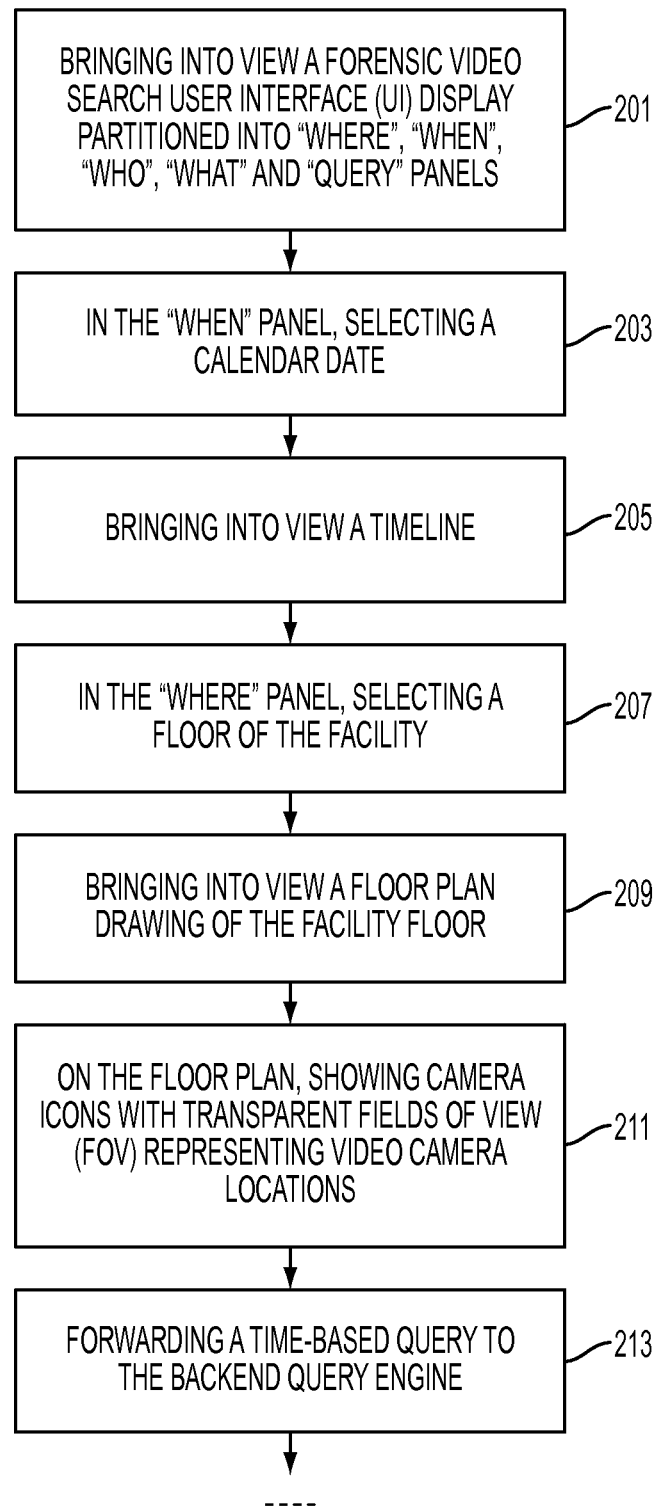
Figure 2B:
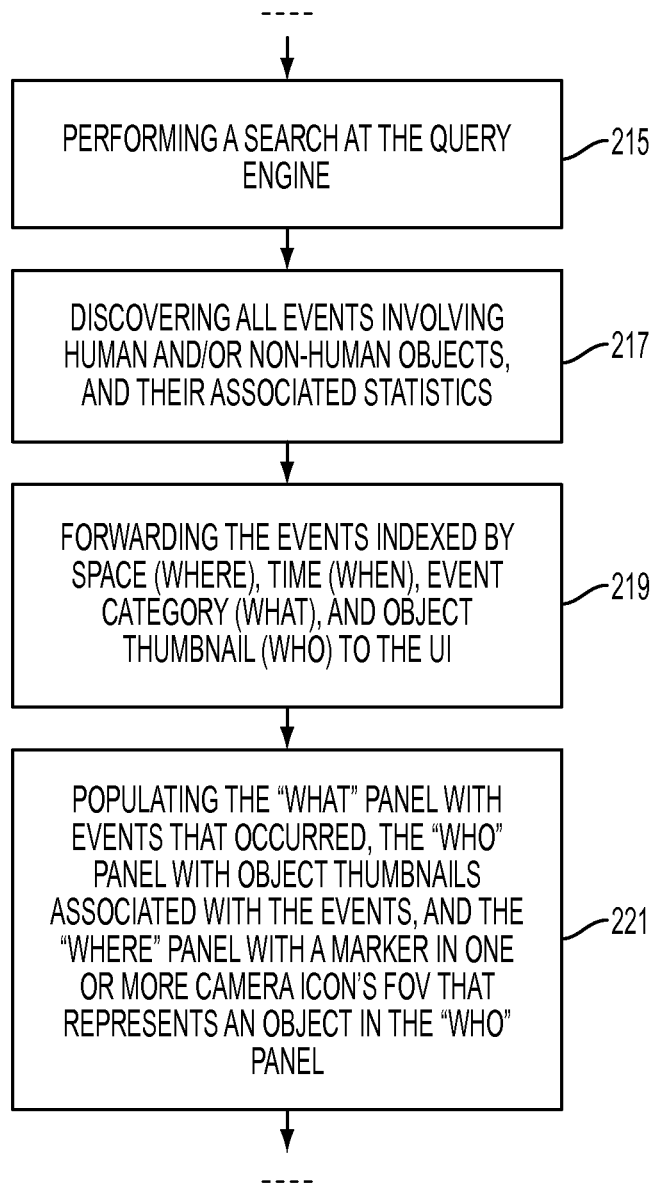
Figure 2C:
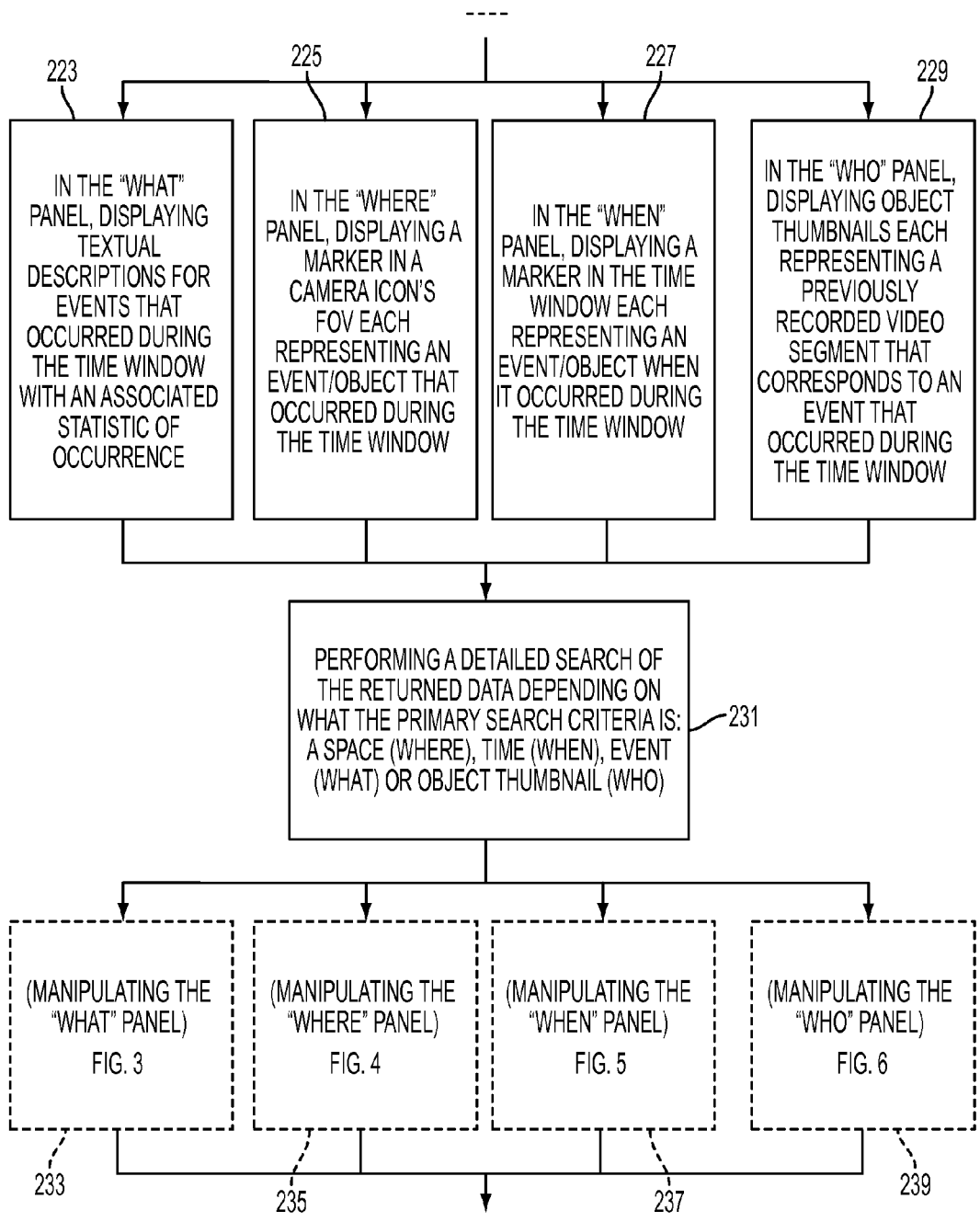
Figure 2D:
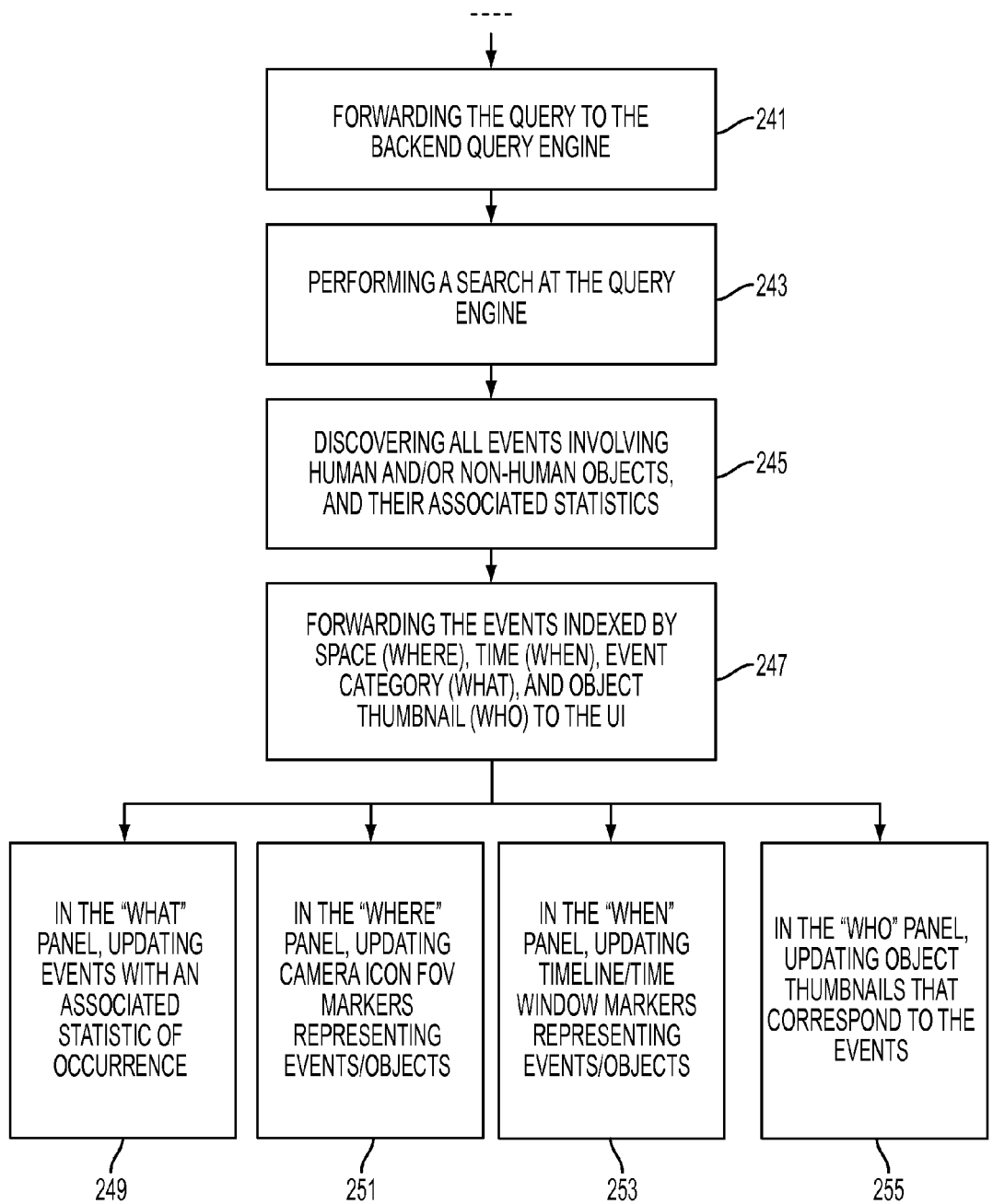

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that provide a forensic video search user interface that accesses databases of stored video event metadata from multiple camera streams and facilitates the search of complex global events that are composed of a number of simpler, low complexity events. Aspects of the user interface may be distributed and executed at and on a plurality of computing devices. For example, a PC, a Mac, a tablet computer, a laptop computer, etc., each employing a mouse, touchpad or touchscreen as a pointing device for user interface display item selection and manipulation. Embodiments may be deployed as software as an application program tangibly embodied on a non-transitory computer readable program storage device. The application code for execution can reside on a plurality of different types of computer readable media known to those skilled in the art.

Events generated by Video Content Analysis (VCA) modules in real-time may not be critical in nature. However, a sequence of low priority events may form a pattern of interest to a user. Searching for complex events requires that a larger space of event metadata be explored in conjunction with any contextual information that might be available or known a priori. Furthermore, it may be necessary to integrate information from diverse sources like video, audio, access control sensors, etc. This added complexity and the fact that event metadata are not 100% reliable requires the user to provide on-line feedback to the application. Accessing archived data during this process makes a user interface application forensic, or after-the-fact in nature—even though it can approach real-time.

FIG. 1 shows an exemplary forensic video search system 101 for the interior and exterior of a facility that may include one or more buildings that have one or more floors (levels) and an exterior area, and, for the building selected in the example, on each floor locate one or more video cameras (sources) $103_1$, $103_2$, $103_x$ (collectively 103) each having a predetermined Field Of View (FOV). The system 101 includes a video processing unit 105, a Video Content Analytics (VCA) module 107, a video store 113, a VCA metadata store 109 and a metadata index 111. A forensic search User Interface (UI) 115 is coupled to a query engine 117, a query broker/database connector 119 and a monitor/computer 121. The monitor may include a touch screen that accepts single and multi-touch finger gestures for selecting and manipulating display items, data and icons.

Each camera 103 FOV captures a scene of an area of the facility. The video cameras 103 may observe the Open Network Video Interface Forum (ONVIF) specification. The camera 103 video streams are coupled to the video processing unit 105, which is coupled to the video store 113 and to the Video Content Analytics (VCA) module 107. The VCA module 107 outputs time-stamped metadata to their respective stores 109, 111. The VCA module 107 generates and outputs (and forwards) metadata in accordance with its algorithms, which includes alarms, events and metadata. The video store 113 may be implemented as Digital Video Recorders (DVRs) or Network Video Recorders (NVRs) for storage and replay. Video data are encoded and stored. The stream-based metadata may be stored with video.

The metadata store 109 receives metadata streams or sequences of metadata documents or metadata messages from the VCA module 107 that include data of objects that may be further processed or stored in the data store 109. Site specific configuration information may be used for the processing and the resulting additional metadata are stored as well. The metadata store 109 stores the data according to the metadata format and schema. The metadata schema may be in a relational database format or in any NoSQL (not only SQL) database schema. The metadata index 111 holds indices for textual metadata, alarms and event logs. It can also comprise indices for multidimensional features and descriptors. The metadata store 109 and the metadata index 111 include output interfaces such as Open Database Connectivity (ODBC), Java Database Connectivity (JDBC), Open Network Video Interface Forum (ONVIF), etc.

When metadata streams are stored in a DVR or NVR, those components become part of a dynamic metadata storage which may comprise a Relational Database Management System (RDBS) holding indexed textual metadata, alarms and event logs. The dynamic metadata storage may also comprise indices for multidimensional features and descriptors.

The UI 115 is a search interface that allows a user to compose and refine queries, and to view and browse results. The UI 115 is the presentation layer software component. The query engine 117, query broker/database connector 119 and domain database 123 are backend components that interface with the video data and associated video metadata.

The query engine 117 receives and controls queries generated by the UI 115 by controlling the sequence of sub-queries to be processed, distributing queries among the heterogeneous databases in the system and aggregating the results and generating additional information from previously retrieved metadata. The domain database 123 is a static application domain model that provides contextual knowledge that supports the search process. The contextual models use logic/rules and statistical models to describe the behavior of persons and objects that occur in the domain.

The forensic search system 101 provides on-demand generation and indexing of some features, that require frame accurate access to the stored videos, VCA procedures and feature matching.

The UI 115 effects a language query that captures the natural mental model of a user to support a search task. The language query follows a direct examination question stream—who, what, when and where. The user is able to formulate any search query which requires a response to one or more of the examination questions.

The user may choose either to ask any of these questions, or if the answers to some questions are known, may choose to instantiate those variables with prior knowledge to constrain the search. For example, a search query may be a combination of the variable form and the instantiated form of the query: find "who" dropped (instantiated what) this bag (instantiated who) here (instantiated where) between 2 and 3 PM (instantiated when).

The UI 115 allows the user to separate "what" representing actions/properties from its modifiers viz., "who", "where" and "when". The user may provide instances of known quantities (such as specifying where/when to search for) or leave such quantities un-instantiated, in which case, they will be searched for and instantiated upon query resolution. The user may specify conjunctions of multiple queries to compose complex queries. The user may iteratively fine tune the returned results by specifying additional constraints. And the user may access a number of relations, both spatial as well as temporal, to connect different sub-queries.

FIGS. 2, 3, 4, 5 and 6 show the forensic video search UI method and FIGS. 7A, 7B, 7C, 7D, 7E, 7F, 7G and 7H show how the UI is navigated to perform different evolving search strategies.

A user opens the application which brings into view on the monitor/computer 121 the UI display 701 which is partitioned into "where" 703, "when" 705, "who" 707, "what" 709 and "query" 711 panels (step 201). A "result" 713 panel opens during video playback and may be moved about the display by dragging.

In the "when" panel, the user selects a calendar date 715 (step 203) which brings into view a timeline 717 that covers the 24 hours of that date (step 205). The user may select a different date and/or adjust the 24 timeline into a narrower (<24 hours) or broader (>24 hours) time window depending on the desired search.

In the "where" panel, the user selects an area icon 719 which represents an area or a floor of the facility (step 207) which brings into view a floor plan drawing of the actual facility area (step 209). In case of a facility with multiple buildings, a first step may include selecting one of the buildings. FIGS. 7A through 7H show floor 1 selected and displayed.

The floor plan includes camera icons 721 shown where actual video cameras are located in the facility that capture real-time video. A transparent fan shape overlaid on the floor plan represents each video camera Field Of View (FOV) 723 (step 211). The level of transparency of an FOV is indicative of the number of events observed within the specified time window in that camera FOV, i.e., the darker the FOV, the greater the number of events observed by that video camera within the specified time window.

In response to the entered date and time window 725, the UI generates and forwards a time-based query to the backend query engine 117 (step 213).

The query engine 117 receives the query, performs a search, and discovers all events involving human and/or non-human objects and their associated statistics (e.g., a count of the number of events) (steps 215, 217). The query engine 117 forwards the events indexed by space (where), time (when), event category (what) and object thumbnail (who) to the UI 115 (step 219).

Events 727 that occurred during the date and time window that are captured by the facility floor video cameras 103 populate the "what" panel, and object thumbnails (video segments) 729 associated with the events 727 populate the "who" panel. Within each camera icon's 721 FOV 723, markers (e.g., dots) 731 corresponding to the objects 729 in the "who" panel are brought into view (step 221). Events are connected to the objects that participate in those events. The markers 731 may represent either events or objects equivalently. These events/objects are also displayed 733 in the time window 725 to indicate the time when an event occurred. When the user mouses over or selects a marker 731 in an FOV 723, the corresponding marker 733 in the time window 725 changes color and the object thumbnail in the "who" panel is highlighted to provide the user with complete information on when the event occurred and which object was involved in that event.

The "where", "when", "who" and "what" panels serve both as a query initiation tool and a results display area.

In response to a user's change or manipulation in one panel, the three other panels update accordingly. For example, the user may adjust or create a new time window 725 in the "when" panel by sliding one or both timeline scrollbars (not shown), thereby broadening or narrowing the time window 725. In response, the UI 115 transparently generates a new time-based query based on the new time window 725, forwards the query to the backend query engine 117, the query engine 117 performs a search and forwards new data to update the UI 115 "where", "who" and "what" panels with new results across all video camera 103 FOVs.

In the "what" panel, textual descriptions for events 727 and objects (not shown) that occurred during the time window 725 are displayed with an associated statistic of each occurrence 735 (step 223). Events are grouped into different categories such as person events, vehicular events, appear events, disappear events, enter events, exit events, action events, alarm events, sensor events (i.e., access control sensor, door sensor, heat sensor, fire sensor, etc.), human enter area 1, human exit area 2, door alarm triggered at time T1, etc. Each event includes an object (i.e., person, vehicle, package, etc.), location, time of occurrence and type of event. Objects are stationary or non-stationary items visible in a video camera's 103 FOV. Stationary objects have been defined and previously identified for each video camera 103 FOV. They may include persons, vehicles, packages, and other objects of interest.

In the "where" panel, markers 731 that correspond to events 727 and objects 729 that occurred during the time window 725 are grouped and displayed within their respective camera icon's FOV 723 (step 225). For each camera icon FOV 723, a count of the number of events that occurred in that FOV is shown as a "heat-map." Each marker 731 represents an instance of the detected event. Mousing over a marker 731 brings into view an object thumbnail 737 from the "who" panel 729 for the event, allowing the user to preview events before selecting them. When the user mouses over or selects a marker 731, the time window marker 733 corresponding to the event and/or object changes color 739 and the thumbnail 737 in the "who" panel is highlighted to provide the user with complete information on when the event occurred and which object was involved in that event. Additionally, in the highlighted thumbnail in the "who" panel, a summary of all events participated in by that object is displayed along with the time that that object first appeared in the scene. The "heat-map" visualizes the total number of events that occurred in each camera icon's FOV 723. As the number of occurrences increase, the color of the FOV 723 becomes more saturated. Since each marker 731 displayed in the camera icon's FOV 723 is indicative of the event and/or object observed in that video camera 103 view, the number of markers 731 will vary as the user scrolls through the list of object thumbnails 729 in the "who" panel. The "heat-map" visualization facilitates the user's attention allocation and visual search.

In the "when" panel, the time window 725 displays a histogram of the number of events over time (e.g., bar chart) that indicates the distribution of occurrence of all events over the selected time window 725. The histogram shows the time segments where the most, least, or any number (depending on the search criteria) of events have occurred. As the user selects a subset of camera icons 721 and/or a subset of events 727 and/or a subset of object thumbnails 729, the shape of the histogram will change to indicate the number of events over time for those specific search criteria (step 227). The timeline may include a decorative design such as a vertical or horizontal gradient to make it visually appealing to the user. The time window markers 733 are arranged by their corresponding time value and an overall count of video events 741 for the time window is shown as a histogram. The histogram shows the distribution of events as they occurred in the time window 725. Each visual marker 733 represents a detected event. Mousing over a marker brings into view an object thumbnail for that event, allowing the user to preview an event before selecting it. The object thumbnail view can appear as a hover tooltip over the marker itself, or it can appear in the "who" panel. Different categories of events may be represented using different marker colors, for example, blue may represent action events and yellow may represent object events. Associated with the object thumbnail may be a link to a video clip containing a video of the object captured during the event, and, upon selecting a view clip button the video clip will be replayed in a panel associated with the "who" panel. The video clip may also be replayed in a pop-up window or panel.

In the "who" panel, a group of object thumbnails 729, each representing a previously recorded video segment, are displayed that correspond to objects that occurred during the time window (step 229). The video thumbnails 729 are sorted in groups according to the time when they were recorded.

The user may perform an examination of the returned data depending on what the primary search criteria is, a desired space—where, a predetermined time—when, a video event category—what, or an object thumbnail—who (step 231).

Figure 3:
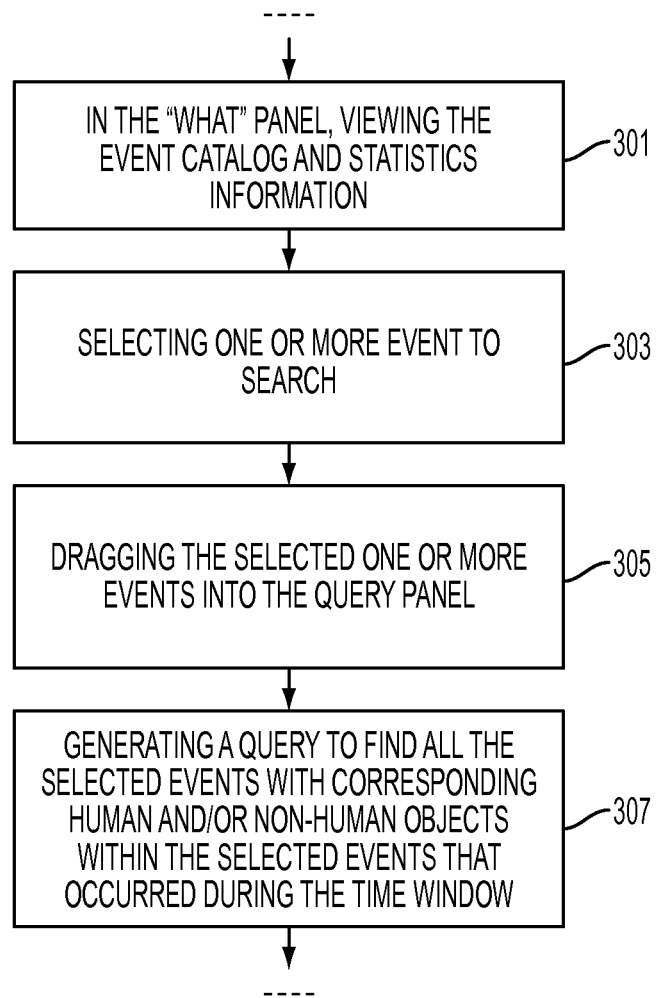
FIG. 3 is an exemplary "what" panel search method.
Figure 7A:
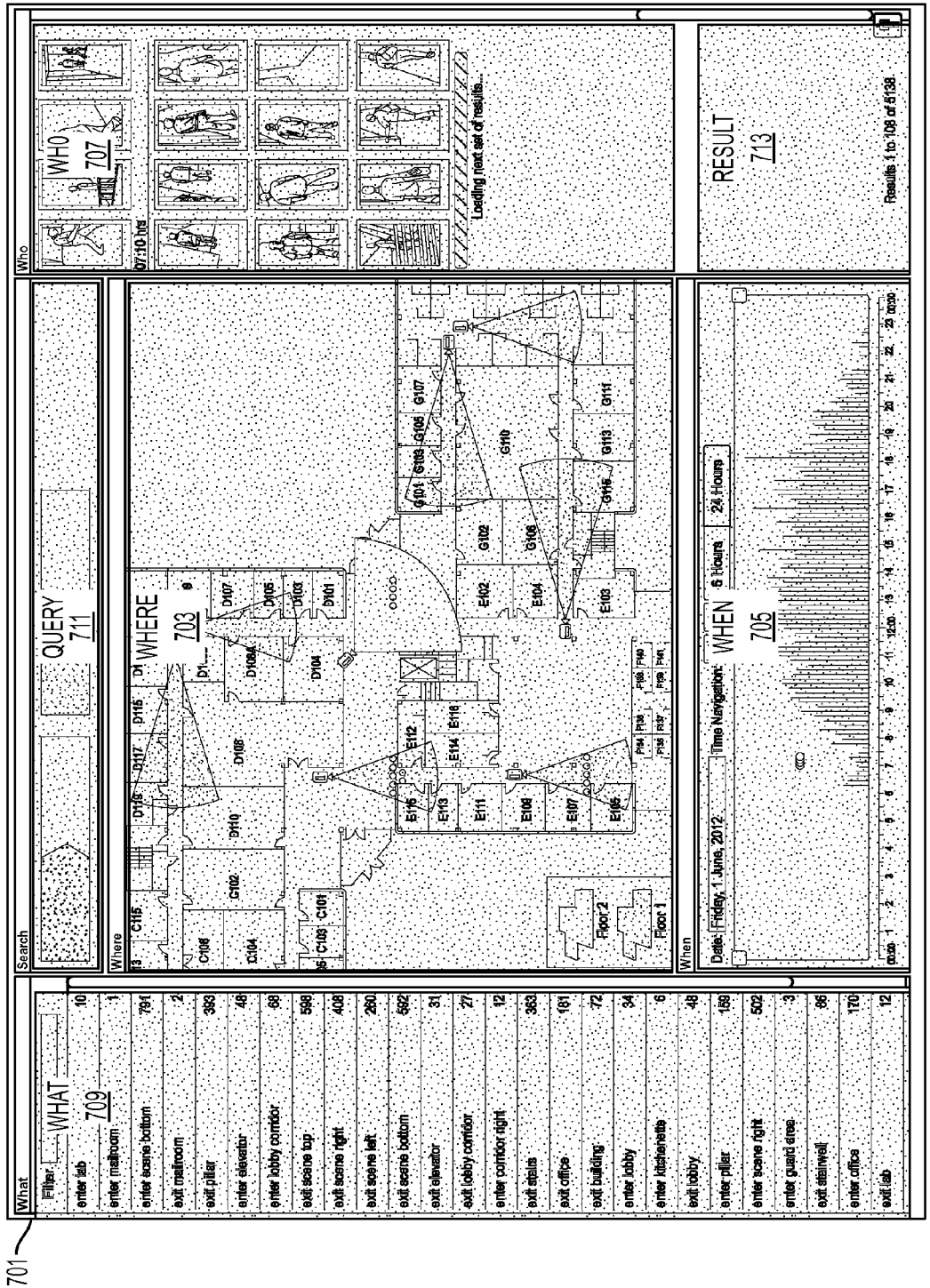
FIGS. 7A, 7B, 7C, 7D, 7E, 7F, 7G and 7H are exemplary computer monitor displays of the forensic video search user interface.
Figure 7B:
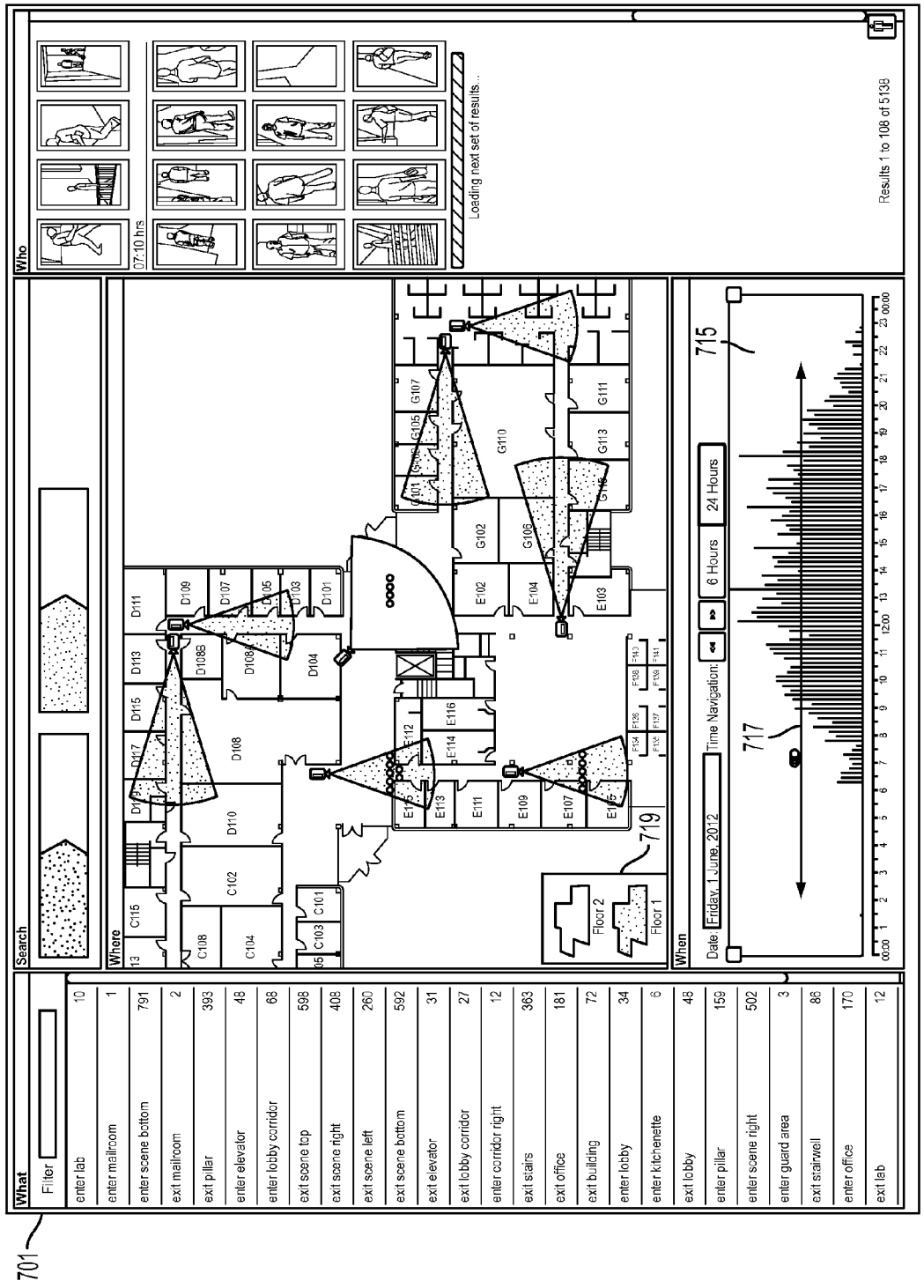
Figure 7C:
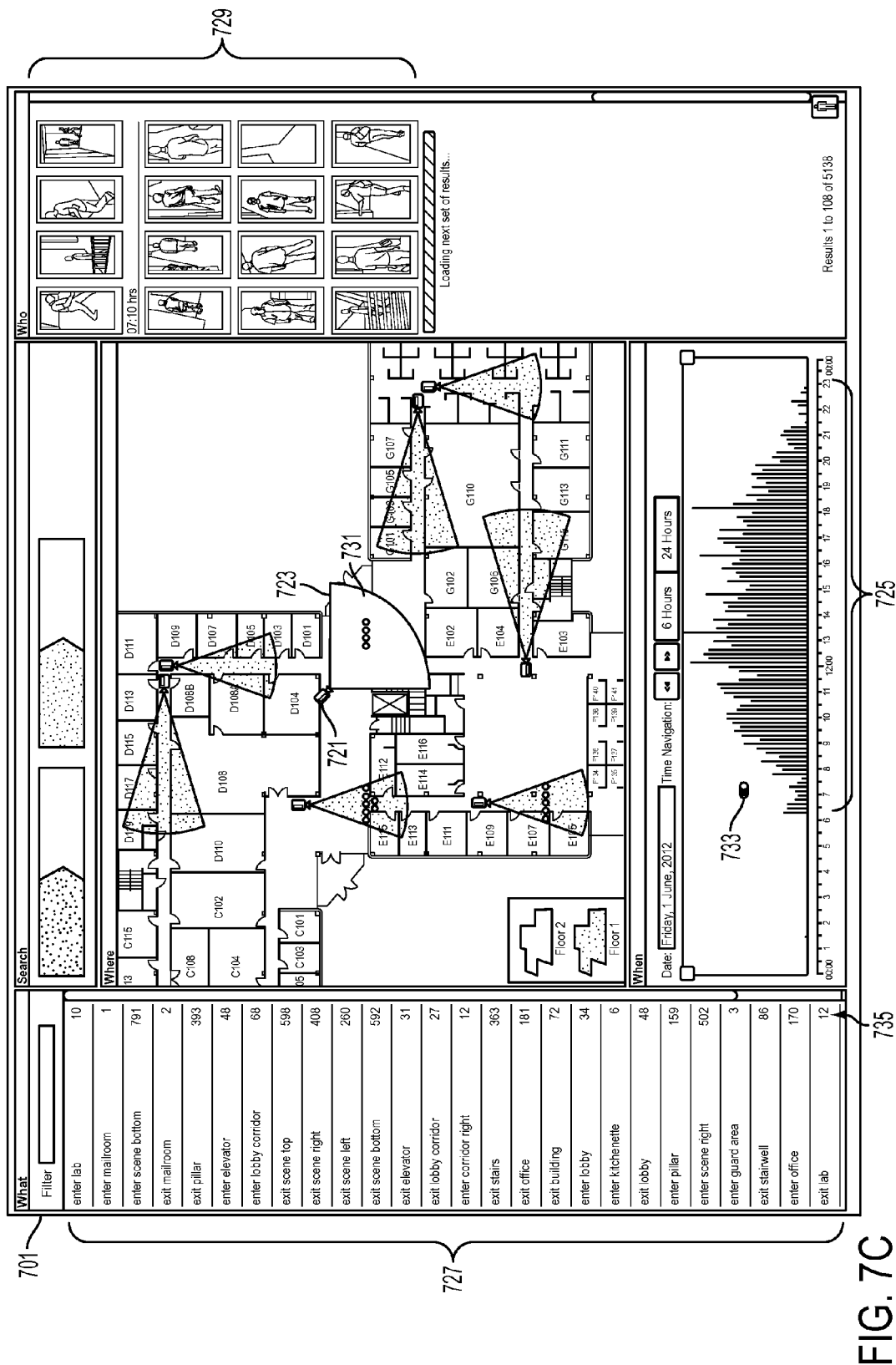
Figure 7D:
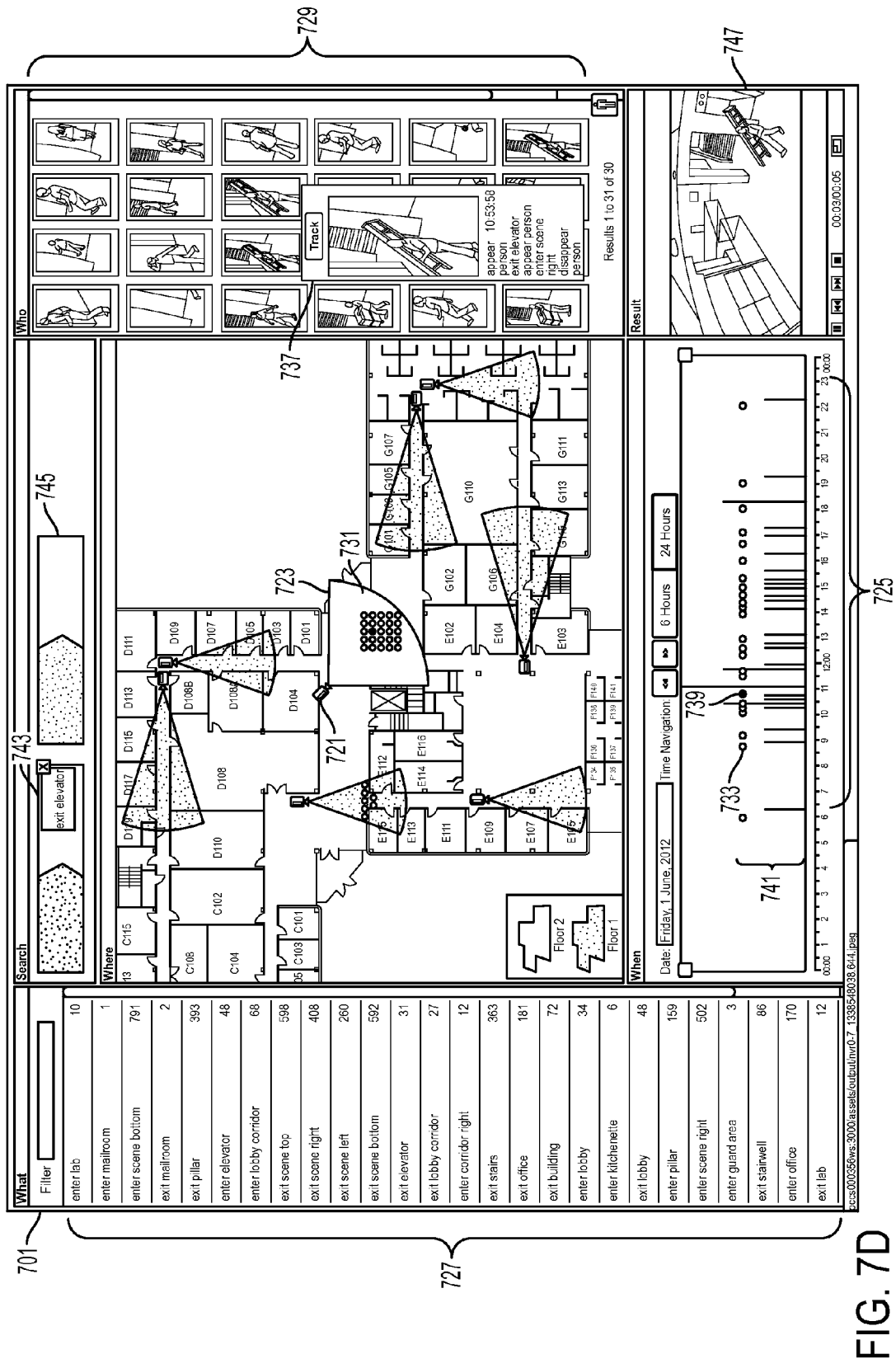
Figure 7E:
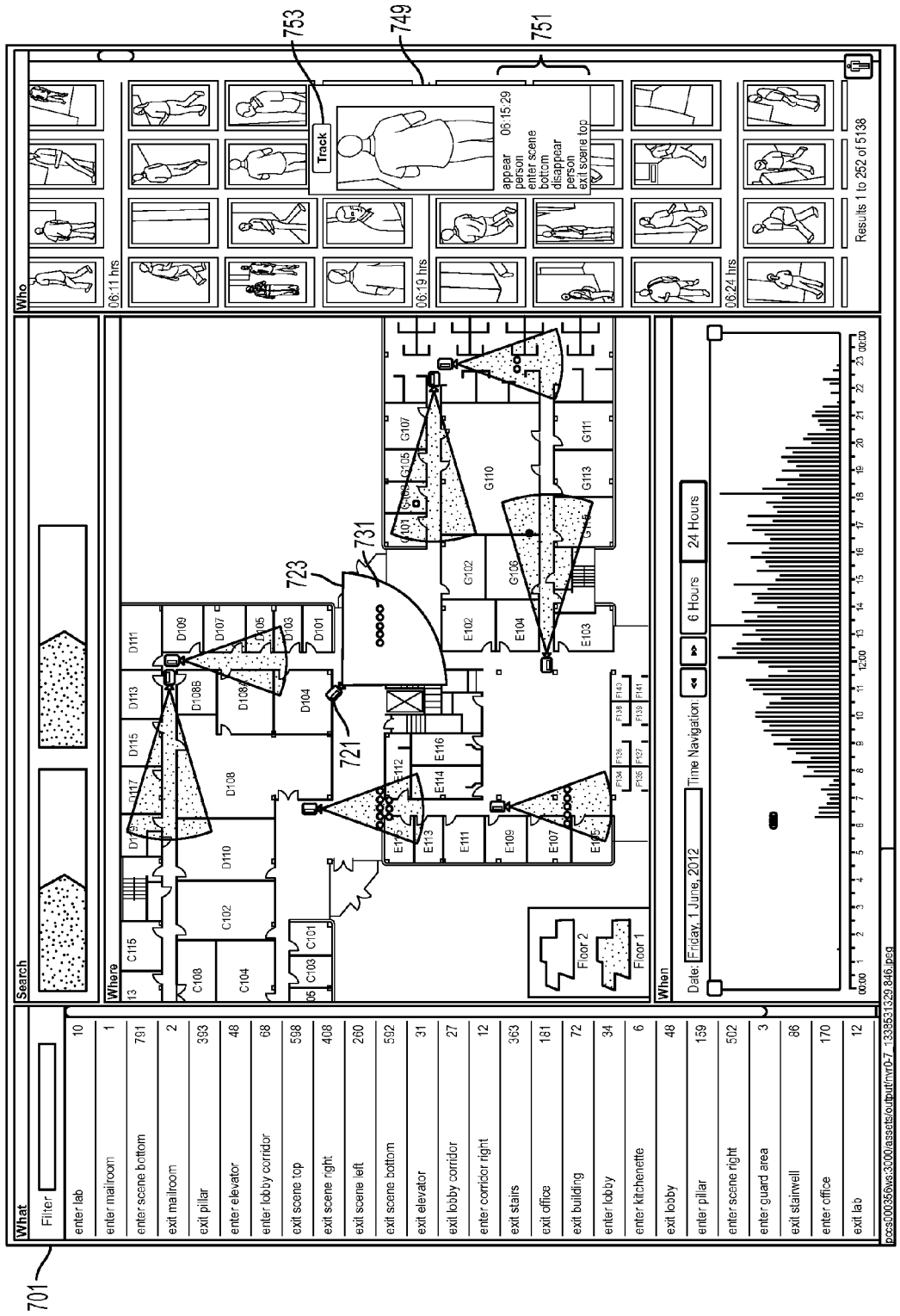
Figure 7F:
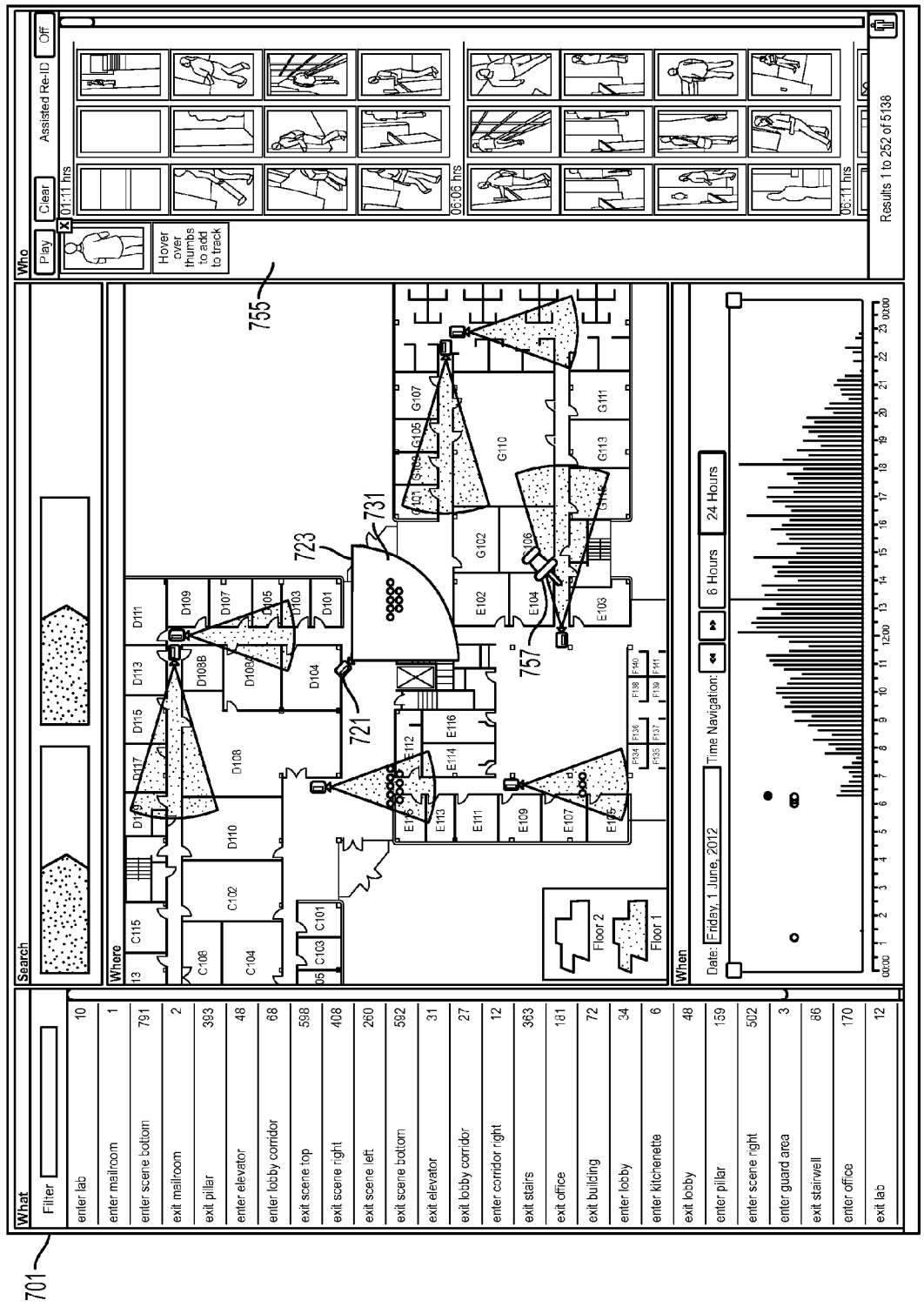
Figure 7G:
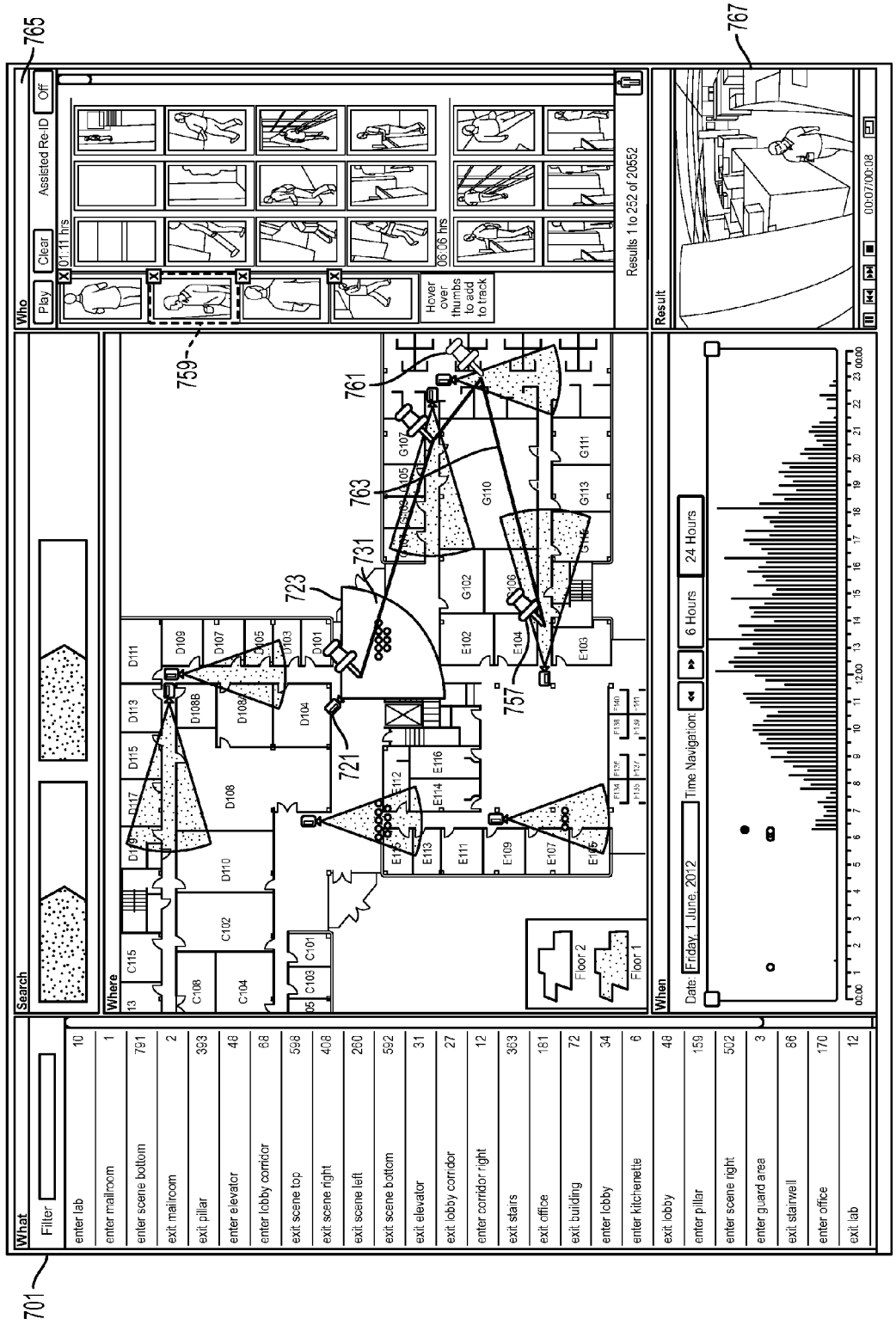
Figure 7H:
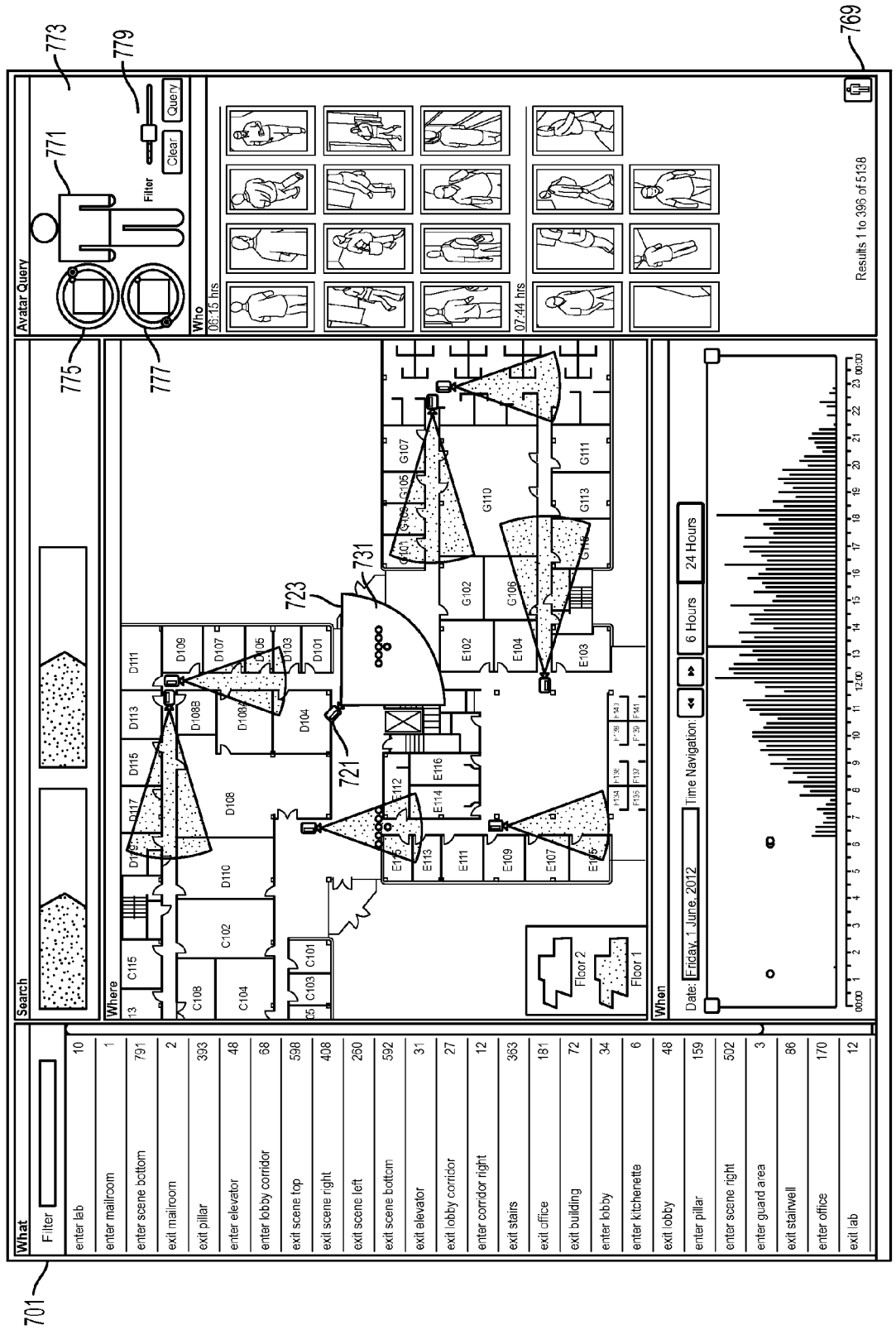

The user may enter the "what" panel and manipulate the events 727 and objects (step 233). For example, the user may view the presented event catalog 727 and statistics information 735 and select one or more event categories to search (FIG. 3, steps 301, 303). The one or more selected events may be dragged into the "query" panel query box 743 (step 305). The UI 115 generates a query to find the selected events with corresponding human and/or non-human objects within the selected event categories that occurred during the time window (step 307). For example, FIG. 7D shows the event category "exit elevator" was dragged from the "what" panel and dropped in the query box 743, which resulted in 31 "who" panel thumbnails 729—the number of object occurrences. Additionally, the user may compose complex queries, e.g., drag additional events into another "query" panel query box 745 and specify whether they would like to search for a conjunction or disjunction or negation or any combination of the events dragged into the query panel. This allows the user to search for compound events such as "('enter through main door' OR 'exit from elevator') AND NOT ('enter into security zone')".

Figure 4:
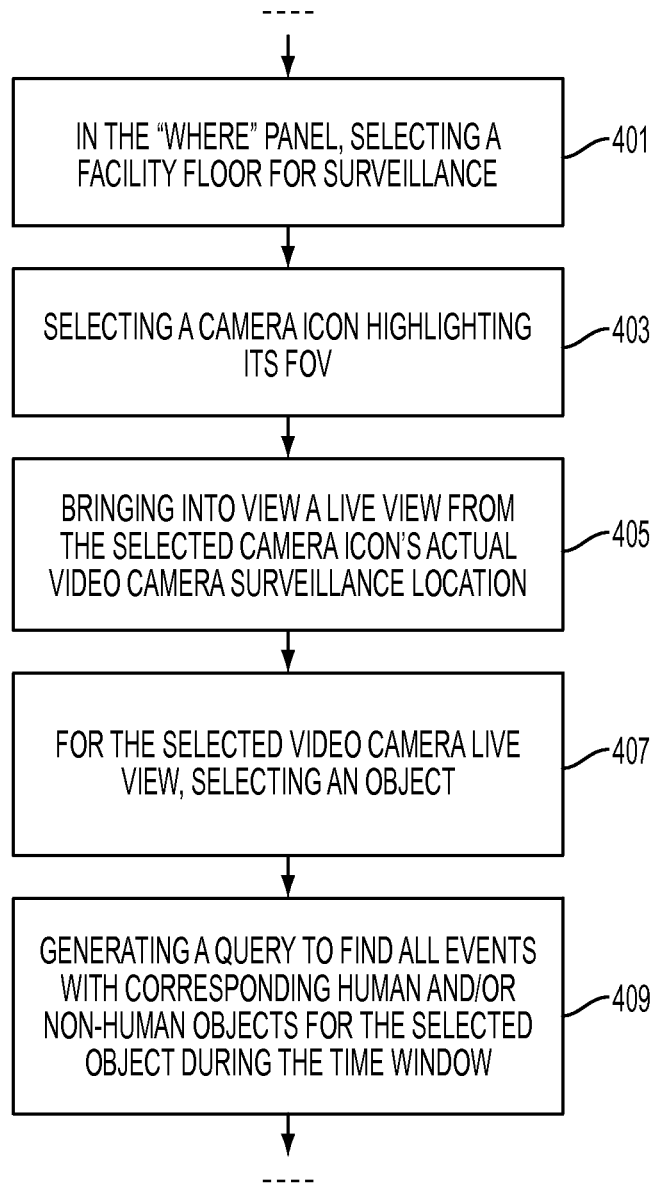
FIG. 4 is an exemplary "where" panel search method.

The user may enter the "where" panel and manipulate the facility space (step 235). For example, a new facility floor may be selected for surveillance (FIG. 4, step 401). Afterwards, a camera icon 721 may be selected, which highlights its FOV 723 and brings into view in the "result" panel a real-time, live view 747 from the selected camera icon's 721 corresponding video camera 103 of what is occurring (steps 403, 405). Objects from the selected camera's live view may be selected to generate a query to find all the events associated with the corresponding human and/or non-human objects during the time window (steps 407, 409). This allows the user to search for events from the current point in time to as far back as the system has been recording video and metadata.

Figure 5:
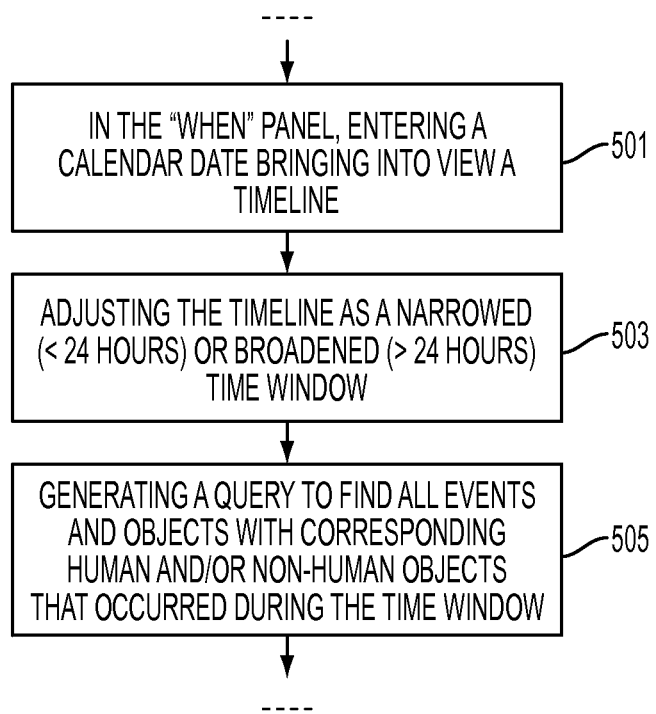
FIG. 5 is an exemplary "when" panel search method.
Figure 6A:
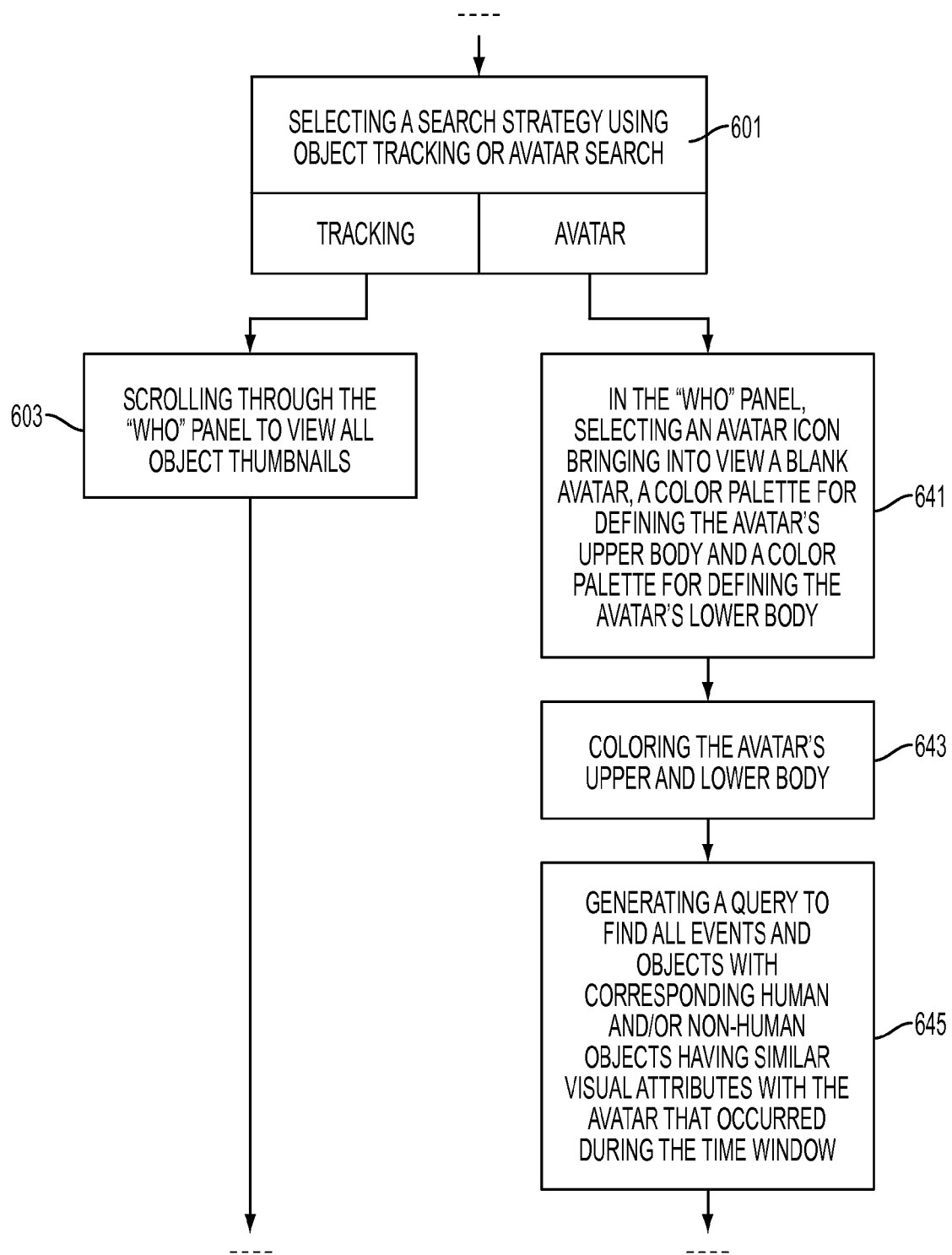
FIG. 6 is an exemplary "who" panel search method.
Figure 6B:
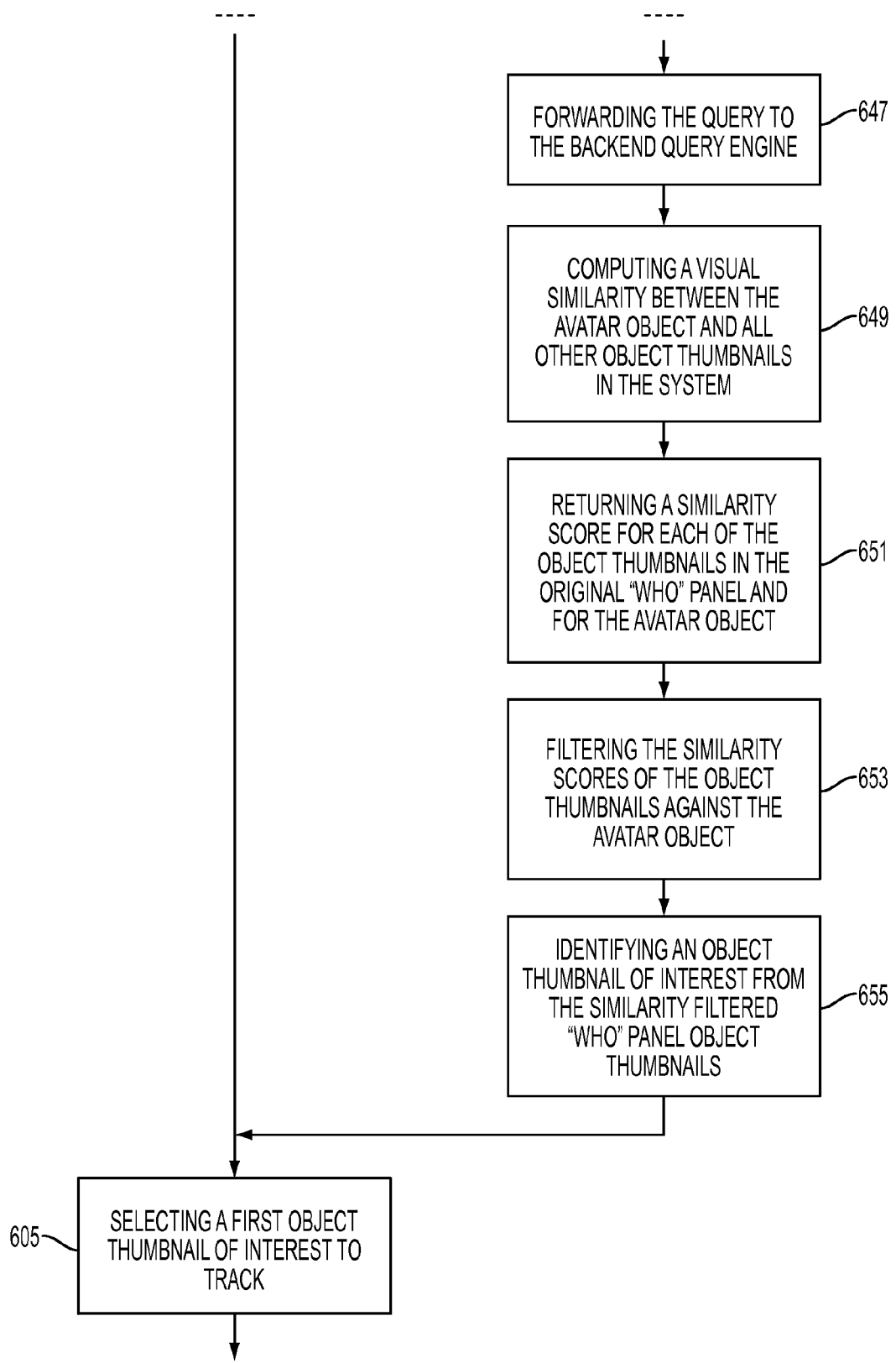
Figure 6C:
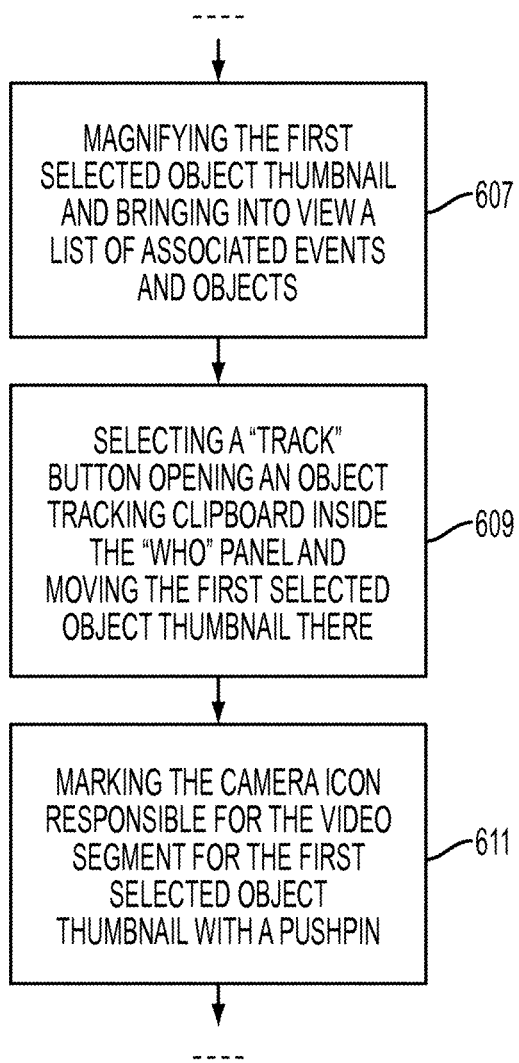
Figure 6D:
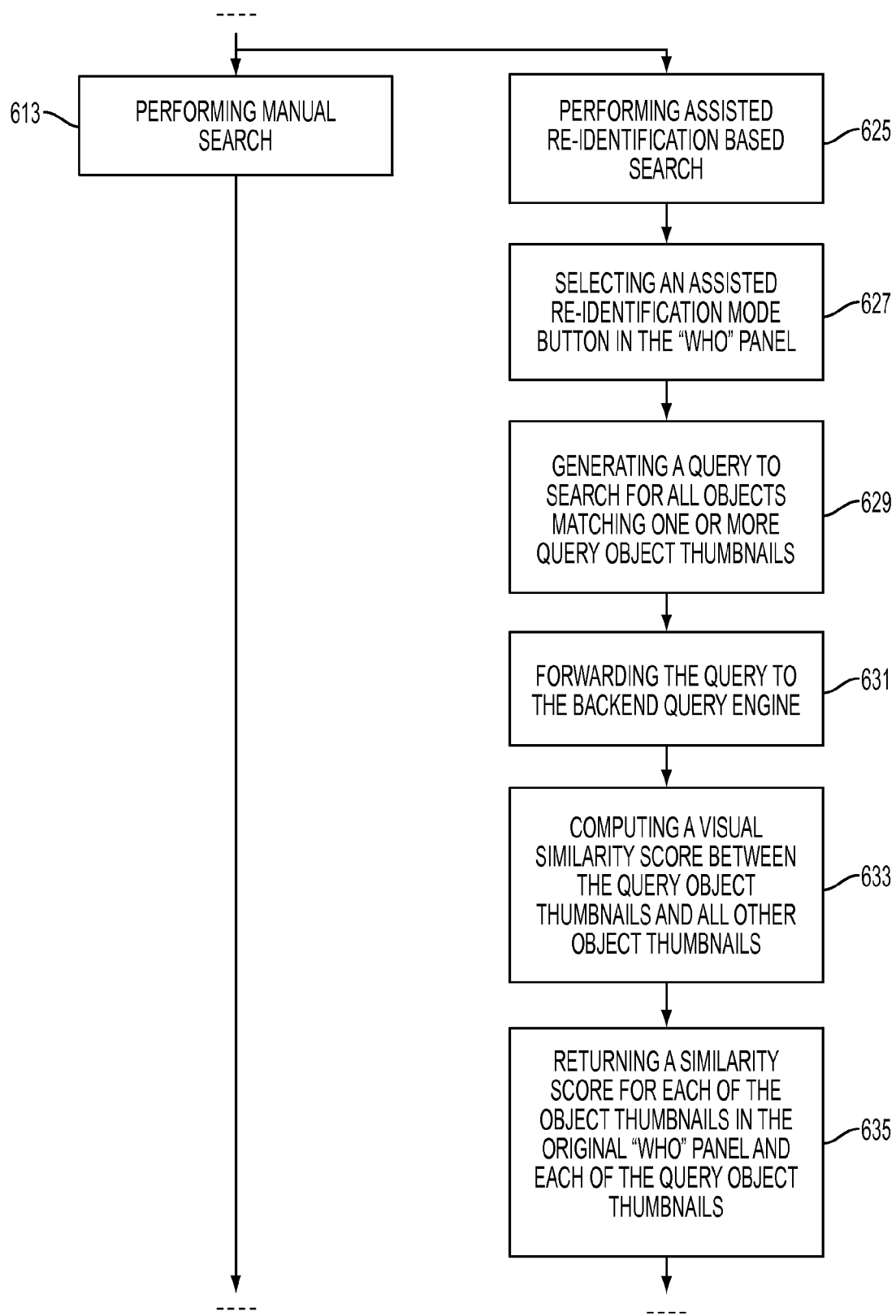
Figure 6E:
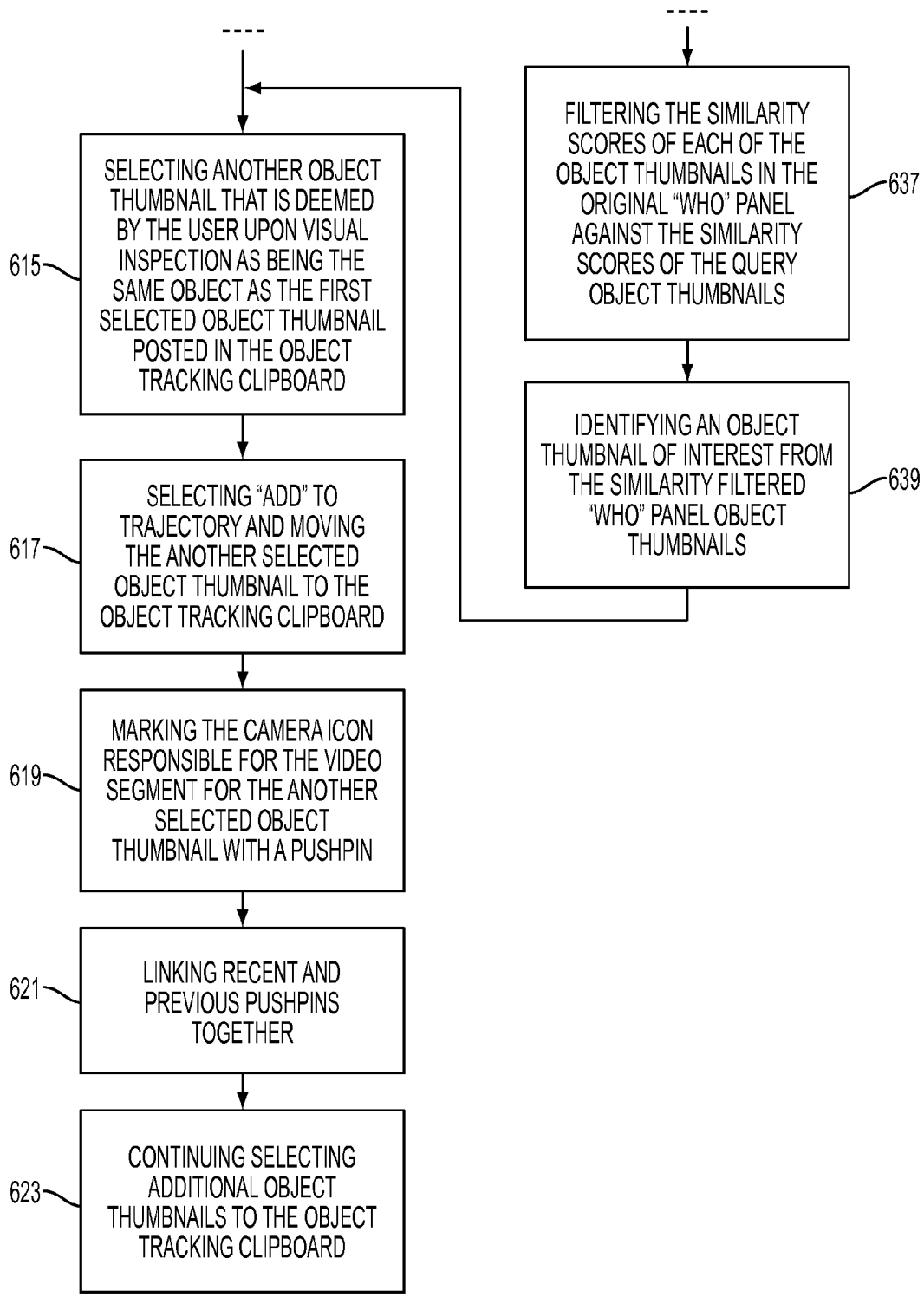

The user may enter the "when" panel and manipulate the calendar date and timeline (step 237). For example, the user may enter a new date, and bring into view a timeline (FIG. 5, step 501). The user may adjust the timeline into a time window (step 503). A query to find all events and objects with corresponding human and/or non-human objects that occurred during the time window is generated (step 505).

The user may enter the "who" panel and manipulate the object thumbnails (step 239). The user has two search strategies: 1) Tracking and 2) Create an avatar (FIG. 6, step 601).

1) Tracking: For the first strategy, the user may scroll through the "who" panel to view all object thumbnails 729 and select a first object thumbnail of interest (steps 603, 605). Selecting the object thumbnail magnifies the thumbnail 749 and brings into view a list of associated events and objects 751 (step 607). If the user decides to track the object through the facility (captured in the facility floor plan) and across time, a "Track" button 753 is selected which opens an "object tracking clipboard" 755 sub-panel within the "who" panel and moves the selected first object thumbnail into it (step 609). A pushpin 757 appears on the facility floor plan marking the camera icon that corresponds to the video camera 103 that captured the video segment for the first selected object thumbnail (step 611). The user may then create a trajectory for the object they are interested in tracking in two ways: i) Manual tracking and ii) Assisted tracking.

i) Manual tracking: The first way to track is for the user to manually search for other objects that they deem, upon visual inspection in the "who" panel, as being the same object as the first selected object thumbnail and moved to the "object tracking clipboard" 755. The user begins tracking by selecting another object thumbnail, adding it by selecting an "Add" button that replaces the "Track" button (not shown) (steps 613, 615, 617). The another selected object thumbnail is moved to the "object tracking clipboard" 755 and a pushpin 761 appears on the facility floor plan marking the camera icon that corresponds to the video camera 103 that captured the video segment for the another selected object thumbnail (step 619). A line 763 is drawn linking (connecting) the recent pushpin 761 to the previous pushpin 757 to indicate a schematic path taken by the object being tracked (step 621). Object thumbnails moved to the "object tracking clipboard" 755 are arranged in a time-sorted manner 759 (either increasing or decreasing meaning that, e.g., in case of increasing time sorted order, the first object in the "object tracking clipboard" 755 appears in the scene before the subsequent objects do). As additional object thumbnails are manually discovered by the user as being the same object as the first one being tracked in the "object tracking clipboard" 755, the user may continue to "Add" these new object thumbnails to the "object tracking clipboard" 755 in a time sorted manner, thereby adding new pushpins corresponding to their camera icon location and draw connecting lines linking a previous object location (pushpin) and the last added object location (pushpin) (steps 621, 623). This method allows the user to create trajectories for objects as they move throughout the facility across multiple video cameras 103.

ii) Assisted tracking: The second way to track is for the user to select an "Assisted Re-Identification" button 765 to track objects in an assisted re-identification mode (steps 625, 627). In the assisted re-identification mode, the UI generates a query to search for all objects that match one or more selected object thumbnails in the "object tracking clipboard" 755 (referred to as query object thumbnails) (step 629). For example, query object thumbnails comprise the first selected object thumbnail and any subsequently selected object thumbnails in the "object tracking clipboard" 755. The query is sent to the query engine 117 where image analysis algorithms compute a visual similarity between the query object thumbnails and all other object images in the system 101 databases (step 631). The query engine 117 returns a similarity score for each of the object thumbnails in the original "who" panel 729 and for the query object thumbnails (steps 633, 635). The greater the similarity, the more likely it is that an object is the same object as the query object thumbnails (but at a different location or time). Once the similarity search query is executed, all object thumbnails in the "who" panel have an associated similarity score to the query object thumbnails, the user can use a "filter" slider (not shown) to filter out objects from the "who" panel 729 that have a score lower than the value selected by the slider (step 637). This results in a smaller number of object thumbnails displayed in the "who" panel 729 (only those objects that are similar to the query object thumbnails). This view is a similarity filtered "who" panel.

The user may then manually search for other objects that they perceive, upon visual inspection in the similarity filtered "who" panel, as being the same object as a query object thumbnail (step 639). Upon discovering such an object, the user may "Add to trajectory" for another object by selecting the "Add" button that now appears in place of the "Track" button 753. The another object thumbnail is added to the "object tracking clipboard" 755 in a time-sorted manner (either increasing or decreasing (meaning that, e.g., in case of increasing time sorted order, the first object in the "object tracking clipboard" appears in the scene before the subsequent objects do). Adding another object thumbnail adds a pushpin to the facility floor plan and a connecting line is drawn linking the recent pushpin to a previous pushpin indicating a schematic path taken by the object being tracked. As more objects are manually discovered by the user as being the same object as the one being tracked in the "object tracking clipboard" 755, the user may continue to "Add" these new objects, the UI will add them to the "object tracking clipboard" 755 in a time sorted manner, add new pushpins corresponding to their location and then draw connecting lines linking a previous object location and the last added object location. This method allows the user to create trajectories for objects as they move throughout the facility across multiple cameras.

In one embodiment, the "assisted tracking" mode can be further enhanced by providing an option to select an object thumbnail from the "who" panel, bringing into view a button to deny it. A new query can then be generated that includes the additional information about the denial.

2) Create an avatar: Another object search strategy available for the user is to select an avatar icon 769 in the "who" panel which brings into view a blank avatar 771 (in an avatar query panel 773), a color palette for defining the avatar's upper body 775 and a color palette for defining the avatar's lower body 777 (steps 641, 643). After the avatar is defined, the UI generates a query to search for all objects having similar visual attributes of the avatar query object (step 645). The query is forwarded to the query engine 117 where image analysis algorithms compute a visual similarity between the avatar query object and all other object images in the forensic video search system 101 databases (steps 647, 649). The query engine 117 returns a similarity score for each of the objects in the original "who" panel and for the avatar object (step 651). The higher the similarity, the more likely it is that that object is visually similar to the avatar object. Once the avatar similarity search query is executed, every thumbnail now has an associated similarity score, the user may use a "filter" slider 777 to filter out objects from the "who" panel that have a score lower than the value selected by the slider (step 653). This user action results in a smaller number of objects displayed in the "who" panel (only those objects that are similar to the avatar object). This view is a similarity filtered "who" panel.

The user may then manually search for other objects that they perceive, upon visual inspection in the similarity filtered "who" panel, as being the same object as one in the "object tracking clipboard" 755 (step 655). Upon discovering such an object, the user may "Add to trajectory" this new object by selecting the "Add" button that now appears in place of the "Track" button 753. This new object is added to the "object tracking clipboard" 755 in a time-sorted manner (either increasing or decreasing (meaning that, e.g., in case of increasing time sorted order, the first object in the "object tracking clipboard" appears in the scene before the subsequent objects do). Adding the new object thumbnail adds a pushpin to the facility floor plan and a connecting line is drawn linking the recent pushpin to a previous pushpin indicating a schematic path taken by the object being tracked. As further objects are manually discovered by the user as being the same object as the one being tracked in the "object tracking clipboard" 755, the user may continue to "Add" these new objects, the UI will add them to the "object tracking clipboard" 755 in a time sorted manner, add new pushpins corresponding to their location and draw connecting lines linking a recent pushpin and a previous pushpin. The user may create trajectories for objects as they move through the facility across multiple cameras.

In the above mentioned object tracking modes, once the object trajectory is constructed to the user's satisfaction, the video clips from the original long video archive may be played back sequentially like a playlist back to back 767 in the "results" panel. As the video playlist corresponding to the tracked objects in the "object tracking clipboard" 755 is being played in the "results" panel, the thumbnail corresponding to the video clip currently being played is highlighted and the pushpin corresponding to the location of the camera icon is highlighted 761. This video playlist playback in the "results" panel and the corresponding highlighting of the thumbnail 759 in the "object tracking clipboard" 755 and on the facility floor plan creates the user experience of a sequence of video clips that seem to track the object as it moves across multiple cameras in the facility.

The query engine 117 receives the UI generated query, performs a search by generating internally a corresponding query suitable for querying the metadata store 109 and metadata index 111, submits the query, and discovers all matching events involving human and/or non-human objects and their associated statistics (steps 241, 243, 245). The query engine 117 forwards the events indexed by space (where), time (when), event category (what) and object thumbnail (who) to the UI (step 247).

To generate the object thumbnails for the events, the query engine 117 issues requests to the video store 113 and, if the results are in compressed form, decodes and locally stores the image/video frames, and forwards the thumbnails to the UI 115 for display in the "who" panel. In a different embodiment, the query engine 117 may only provide the respective information for retrieving the thumbnails from the video store 113 to the UI 115.

These locally stored images are also used for further processing in the query engine 117 to calculate the similarity/distance to the query image(s) selected by the user during the "assisted re-identification" mode and the avatar query object.

Updates of events 727 are displayed in the "what" panel. The events are grouped into different categories. Each updated event includes its associated statistics (step 249).

Updates of visual markers on the facility floor plan corresponding to all detected events are displayed in the "where" panel. The visual markers 731 are grouped into different camera icon 721 FOVs 723. For each camera icon FOV 723, the update visualizes its associated event statistics (step 251).

Updates of the list of visual markers 733 in the time window corresponding to all detected events are displayed in the "when" panel. The markers 733 are arranged by their corresponding time value. The updates visualize overall event statistics (step 253).

Updates of object thumbnails corresponding to all detected events are displayed in the "who" panel. The object thumbnails are grouped by their corresponding time value (step 255).

In one embodiment, the input for "where", "when", "what" and "who" panels may be pushed by or pulled from a Video Management System (VMS) to which the forensic search system 101 is coupled. For example, the input for the "where" part of a query may be the set of cameras a user is currently monitoring in the VMS. In another embodiment, the input for the "when" panel may be updated repeatedly, e.g., every 5 seconds, to issue queries around the current time.

One or more embodiments of the present invention have been described. Nevertheless, it will be understood that various modifications may be made without departing from the spirit and scope of the invention. Accordingly, other embodiments are within the scope of the following claims.

What is claimed is:

1. A forensic video search User Interface (UI) method with query processing for a facility having video camera surveillance, the method comprising:
    generating a display partitioned into "when", "where" and "who" panels;
    in the "when" panel, entering a point in time and/or a timeline;
    in the "where" panel, selecting an area or a floor of the facility bringing into view a map or a floor plan wherein the map or the floor plan includes one or more camera icons showing a Field Of View (FOV) representing actual video camera surveillance locations on the selected facility area or floor;
    based on the entered time and/or timeline and the selected facility area or floor, generating a time based query to discover events and objects involving human and non-human objects that occurred comprising:
        populating the "who" panel with one or more object thumbnails wherein an object thumbnail is an image that represents an object from a previously recorded video segment where the image is associated with an event;
        populating the "where" panel with a plurality of markers in at least one of the one or more camera icons' FOV wherein each camera icon FOV marker represents a different object thumbnail in the "who" panel;
    overlaying levels of transparency of the FOV of the one or more camera icons to indicate numbers of events observed by each represented actual video camera surveillance location during the time entered in the "when" panel.

2. The method according to claim 1 further comprising a "what" panel and populating the "what" panel with textual descriptions of discovered events that occurred during the entered time and/or timeline and in the selected facility area or floor, wherein an event includes one or more objects, location, time of occurrence and/or type of event.

3. The method according to claim 1 wherein the object thumbnail has an associated video segment with a predefined time duration.

4. The method according to claim 3 further comprising selecting the object thumbnail and playing back its video segment in a video panel or pop up.

5. The method according to claim 1 further comprising selecting the object thumbnail, bringing into view a list of events the object in the selected object thumbnail appears in, and a beginning time for the previously recorded video segment containing the object represented by the object thumbnail.

6. The method according to claim 1, wherein the display is further partitioned into a "what" panel populated with textual descriptions of discovered events that occurred during the entered time and/or timeline and in the selected facility area or floor, wherein an event includes one or more objects, location, time of occurrence and/or type of event, the method further comprising:
    populating the timeline with one or more timeline markers wherein each timeline marker represents the object thumbnail shown in the "who" panel; and
    populating the timeline with a metric of a number of events displayed in the "what" panel at a time each event occurred.

7. The method according to claim 2 further comprising including an associated statistic of occurrence with each event in the "what" panel.

8. The method according to claim 2 wherein events include categories selected from a group consisting of person events, vehicular events, appear events, disappear events, enter events, exit events, action events, alarm events, sensor events, human enter area 1, human exit area 2 and door alarm triggered at time T1.

9. The method according to claim 2 further comprising populating the "what" panel with textual descriptions of object types.

10. The method according to claim 9 wherein the object types include persons, vehicles and packages.

11. The method according to claim 2 further comprising a "query" panel, further comprising:
- in the "what" panel, selecting an event to search;
- dragging the selected event into the "query" panel;
- generating a query to find events with corresponding human and/or non-human objects with the selected event; and
- updating the "when", "where", "who" and "what" panels.

12. The method according to claim 2 further comprising a "query" panel, further comprising:
- in the "who" panel, selecting an object thumbnail to search;
- dragging the selected object thumbnail into the "query" panel;
- generating a query to find events with corresponding human and/or non-human objects with the selected object thumbnail; and
- updating the "when", "where", "who" and "what" panels.

13. The method according to claim 1 further comprising:
- selecting a camera icon;
- highlighting its FOV; and
- bringing into view a live view from the selected camera icon's corresponding surveillance video camera.

14. The method according to claim 1 further comprising:
- in the "when" panel, entering a calendar date, bringing into view a timeline of the calendar date;
- generating a query to find events with corresponding human and/or non-human objects that occurred during the calendar date; and
- updating the "when", "where" and "who" panels.

15. The method according to claim 14 further comprising:
- adjusting the timeline of the calendar date as a time window wherein the time window may be narrowed or broadened depending on a desired search;
- generating a query to find events with corresponding human and/or non-human objects that occurred during the time window; and
- updating the "when", "where" and "who" panels.

* * * * *